(12) United States Patent
Ahm

(10) Patent No.: US 7,188,449 B2
(45) Date of Patent: Mar. 13, 2007

(54) SEED TAPE

(75) Inventor: Poul Henrik Ahm, Altea (Alicante) (ES)

(73) Assignee: Bentle Products AG, Baar (CH)

( * ) Notice: Subject to any disclaimer, the term of this patent is extended or adjusted under 35 U.S.C. 154(b) by 167 days.

(21) Appl. No.: 10/529,344

(22) PCT Filed: Sep. 25, 2002

(86) PCT No.: PCT/DK02/00633

§ 371 (c)(1),
(2), (4) Date: Mar. 25, 2005

(87) PCT Pub. No.: WO2004/028238

PCT Pub. Date: Apr. 8, 2004

(65) Prior Publication Data

US 2005/0268546 A1    Dec. 8, 2005

(51) Int. Cl.
*A01C 1/04* (2006.01)
(52) U.S. Cl. .......................................................... 47/56
(58) Field of Classification Search ...................... 47/56
See application file for complete search history.

(56) References Cited

U.S. PATENT DOCUMENTS

| | | | | | |
|---|---|---|---|---|---|
| 1,160,279 | A | * | 11/1915 | Gray | 47/56 |
| 2,281,927 | A | * | 5/1942 | Fischer | 47/56 |
| 2,571,491 | A | * | 10/1951 | Schindler | 47/56 |
| 2,812,618 | A | * | 11/1957 | Weston | 47/56 |
| 4,866,879 | A | * | 9/1989 | Wood et al. | 47/56 |
| 5,210,975 | A | * | 5/1993 | Beckerman | 47/56 |
| 6,578,317 | B1 | * | 6/2003 | Ahm | 47/56 |
| 6,701,664 | B2 | * | 3/2004 | Ahm | 47/56 |
| 6,735,902 | B1 | * | 5/2004 | Ahm | 47/56 |

FOREIGN PATENT DOCUMENTS

GB    2191925 A  * 12/1987

* cited by examiner

*Primary Examiner*—Francis T. Palo
(74) *Attorney, Agent, or Firm*—Cooper & Dunham LLP

(57) ABSTRACT

A seed tape (1) includes successively arranged germinating units (2a, 2b, 2c) made of a planar material. These germinating units are coherent or secured to a carrier strip (3) of at least one layer of biodegradable material. Each germinating unit (2a, 2b, 2c) is intended to be bedded out in the ground (12) or a growth substrate and includes a mixture of carrier (7), at least one additive (9) and optionally adjuvants (8) in addition to one or more seeds (6). The additive or additives (9) include water-absorbing materials, such as superabsorbing polymers. Each germinating unit (2a, 2b, 2c) is provided with at least one narrow zone (5) of water-repellent material across its surface adjacent or at least up to the upper edge of said unit. The material of the narrow zone penetrates the planar material of the germinating unit (2a, 2b, 2c) throughout the entire thickness thereof. As a result, the seed tape is not easily subjected to a drying out due to sun and wind although the upper end of the tape should project slightly from the ground.

18 Claims, 3 Drawing Sheets

SEED TAPE

TECHNICAL FIELD

The invention relates to a seed tape including successively arranged germinating units made of plane material and being coherent or secured to a carrier strip of at least one layer of biodegradable material, and where each germinating unit is intended to be vertically bedded out in the earth or in a growth substrate and in addition to one or more seeds includes a mixture of carrier, at least one additive and optionally a filler and adjuvants, and where the additive or the additives include water-absorbing materials, such as superabsorbing polymers.

BACKGROUND ART

When the tape is to be vertically positioned, the bedding out of a seed tape is encumbered with the problem that said seed tape is not positioned sufficiently deeply in the earth. A small piece of the upper end of the tape projects from the earth, and long periods of windy weather or sunshine imply that the germinating units of the seed tape dry up because each germinating unit acts as a wick for the transport of the moisture to the surface of the ground, and accordingly the wind or sun dries up the germinating units through the projecting end of the seed tape. The latter is a rather unsatisfactory effect.

BRIEF DESCRIPTION OF THE INVENTION

The object of the invention is to provide a seed tape of the above type and which ensures that although a small piece of the seed tape projects from the ground then the germinating units are not easily dried up.

The seed tape according to the invention is characterised in that each germinating unit is provided with at least one narrow zone of water-repellent material across said unit, adjacent or at least up to the upper edge of said unit, where the water-repellent material penetrates the plane material of the germinating unit throughout the entire thickness thereof. As a result, each germinating unit is provided with a water-repellent barrier or seal in the upward direction, said barrier or seal completely eliminating, optionally considerably reducing the moisture-evaporating tendency of the upper end of said germinating units.

According to the invention the water-repellent material may be silicone or silicone oil which turned out to be particularly easy to apply and being very efficient in practice.

Furthermore, the narrow zone of water-repellent material may according to the invention be of a height of at least 1 mm, which turned out to be particularly advantageous.

In addition, the narrow zone of water-repellent material may according to the invention be of a height of 3.5 to 10 mm, preferably 4 to 8 mm, especially 5 mm. These widths turned out to be particularly advantageous.

According to the invention, the narrow zone of water-repellent material may be of a height of 5 to 10% of the height of the germinating unit, which turned out to be a particularly advantageous embodiment.

Moreover, the plane material of the germinating units may according to the invention be paper, preferably of a weight of 30 to 60 g/m$^2$, especially 40 to 50 g/m$^2$, where the carrier strip maybe made of paper as well. The resulting seed tape is both inexpensive and efficient.

According to the invention, the water-repellent material may be wax, stearin, paraffin or caoutchouc applied onto the plane material of the germinating unit as a hot melt and subsequently cured. These substances and this way of application turned out to provide a particularly efficient barrier on top of the individual germinating units.

According to the invention, the water-repellent material may be plastics, such as polylactide (PLA), optionally polylactide (PLA) plus polysaccharides. In this manner the resulting water-repellent barrier is mechanically strong, and accordingly it presents an improved tolerance to animals or birds.

Furthermore, a narrow zone of water-repellent material may be provided at or adjacent the lower edge of each germinating unit As a result, the water contained in each germinating unit is not immediately passed downwards into the ground in the situation where the seed tape is bedded out in particularly dry ground. In addition it is ensured that the lower portion of the seed tape ensures an improved water-air proportion at the lower portion of the germinating units while said seed tape is placed in a bedding out box.

According to the invention, the tape maybe continuously manufactured as the germinating units maybe manufactured by means of one or more paper ribbons of a width twice the width of the completed tape, a zone of water-repellent material of a double width being applied onto the centre of said paper ribbon or ribbons, whereafter said ribbon or ribbons are subsequently slotted through the centre of the water-repellent zone. The resulting seed tape is particularly inexpensive.

Moreover, a deterrent may according to the invention be added to the water-repellent material, said deterrent preferably being a substance affecting the sense of smell or taste of animals or birds. In this manner the tendency of animals or birds picking in and optionally damaging the seed tape has been reduced.

Finally, the narrow water-repellent zone may according to the invention at the ends be extended a short distance downwards along the vertical edges of each germinating unit, such as for instance 2 to 5 mm. In this manner the tendency of water evaporating from the ends of the germinating units projecting beyond the ground has been further reduced.

In the introduction to the description it is mentioned that each germinating unit includes a mixture of carrier, at least one additive and optionally adjuvants in addition to one or more seeds. The term "carrier" is here inter alia to be construed as one or more of the substances: silica, vermiculite, perlite, zeolite, cellulose materials, such as wood fibres and sphagnum, clay, optionally burned clay, mineral fibres, such as rock wool or the like substances, whereby it is possible to obtain a desired degree of water retaining capacity, water conveying capacity, ion exchanging properties etc. The term "adjuvants" are here in principle to be construed as all substances compatible with the remaining, selected substances, and as substances with a favourable effect on the storing, the germination and the growth of the seed and the later sprout. The adjuvants can for instance include: pesticides, including herbicides, insecticides, especially systemic insecticides, fungicides, virae, cultures of bacteria, cultures of fungi, such as Trichoderma, fungus spores, microencapsulated fungicides, eggs from useful insects, such as predatory nematodes, insect eggs, fertilizers, hormones, enzymes, animal repellants, pH-adjusting agents, carbon, clay particles, trace elements, such as molybdenum, wood fibres or wood powder, kieselguhr, surfactants, silica and other additives with a favourable effect on the germination and the growth of plants, where several substances are available in microencapsulated form with the result that they are protected against biodegradation and a controlled release thereof can be carried out. The adjuvants can also include potassium nitrate and sodium chloride.

These substances can optionally be joined by means of a binder, which for instance includes polyvinyl alcohol, polyethylene glycol or other plant-compatible binders, such as water or water containing polysaccharides or mixtures thereof.

BRIEF DESCRIPTION OF THE DRAWINGS

The invention is explained in detail below with reference to the drawing, in which.

BEST MODE FOR CARRYING OUT THE INVENTION

Figure 1:
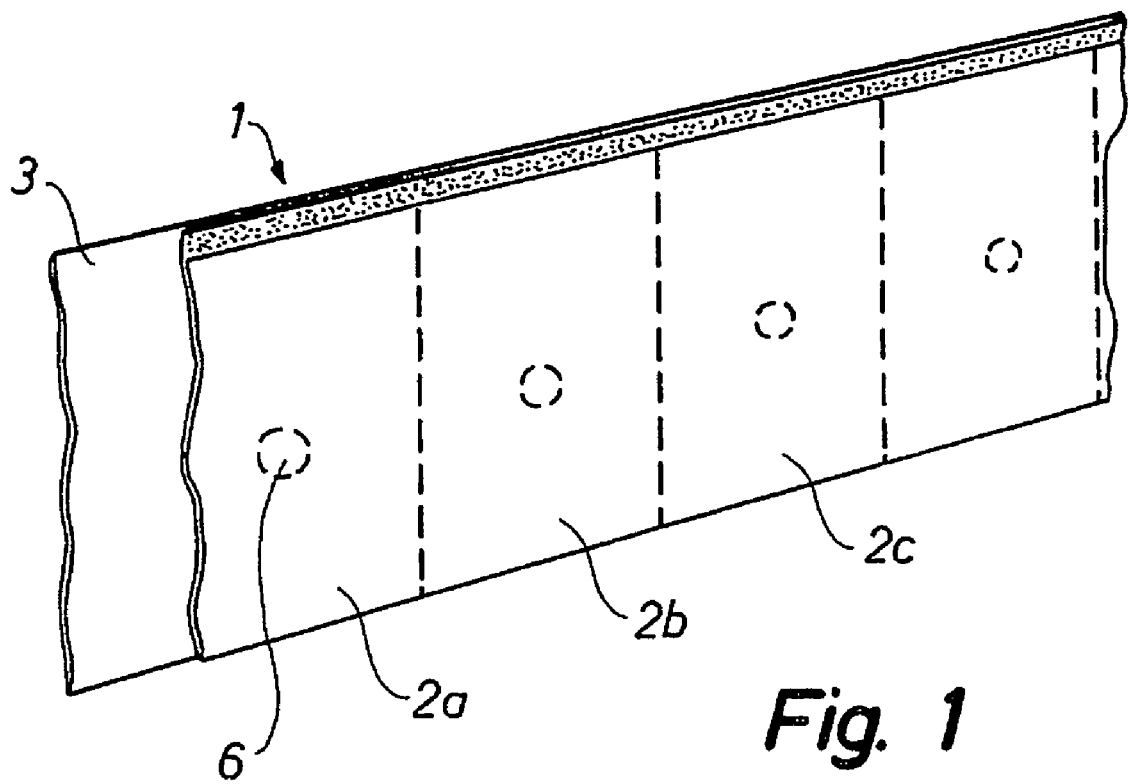
FIG. 1 illustrates an embodiment of a seed tape according to the invention.

The seed tape 1 shown in FIG. 1 includes successively arranged germinating units 2a, 2b, 2c etc., which can be coherent or secured to a carrier strip 3. The carrier strip 3 is formed by at least one layer of biodegradable material, and each germinating unit 2a, 2b, 2c is made of a plane material, preferably paper, in one or more layers. The seed tape and consequently each germinating unit are intended to be vertically bedded out in the ground or in a suitable growth substrate. In addition to one or more seeds 6, each germinating unit includes a mixture of carrier 7, at least one additive 9 and optionally adjuvants 8. All these substances encircle the seed 6. They can for instance be glued onto the germinating unit by means of a binder not shown.

Figure 2:
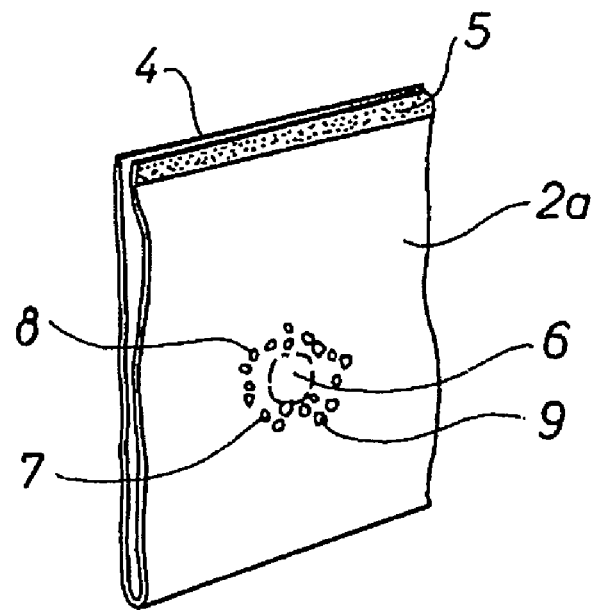
FIG. 2 is a perspective view of a germinating unit including a zone of water-repellent material at the top.

As illustrated in FIG. 2, each germinating unit 2a is provided with at least one narrow zone 5 of water-repellent material across said unit, adjacent or at least up to the upper edge 4 of said unit, where the narrow zone penetrates the plane material of the germinating unit throughout the entire thickness thereof.

The narrow zone 5 can have a heighth of at least 1 mm. The heighth can also be in the range 3.5 to 10 mm The height his preferably 4 to 8 mm, especially 5 mm h can also be 5 to 10% of the height H of the germinating unit. The plane material of the germninating units 2a, 2b, 2c etc. can be paper, preferably paper of a weight of 30 to 60 g/m$^2$, especially 40 to 50 g/m$^2$. The carrier strip 3 can also be made of paper.

The water-repellent material of the narrow zone 5 can be silicone or silicone oil. The water-repellent material of the above zone can also be wax, stearin, paraffin or caoutchouc applied onto the plane material of the germinating unit as a hot melt and subsequently cured.

In addition, the water-repellent material of the narrow zone 5 can be plastics, such as polylactide (PLA), optionally polylactide (PLA) plus polysaccharides.

Figure 3:
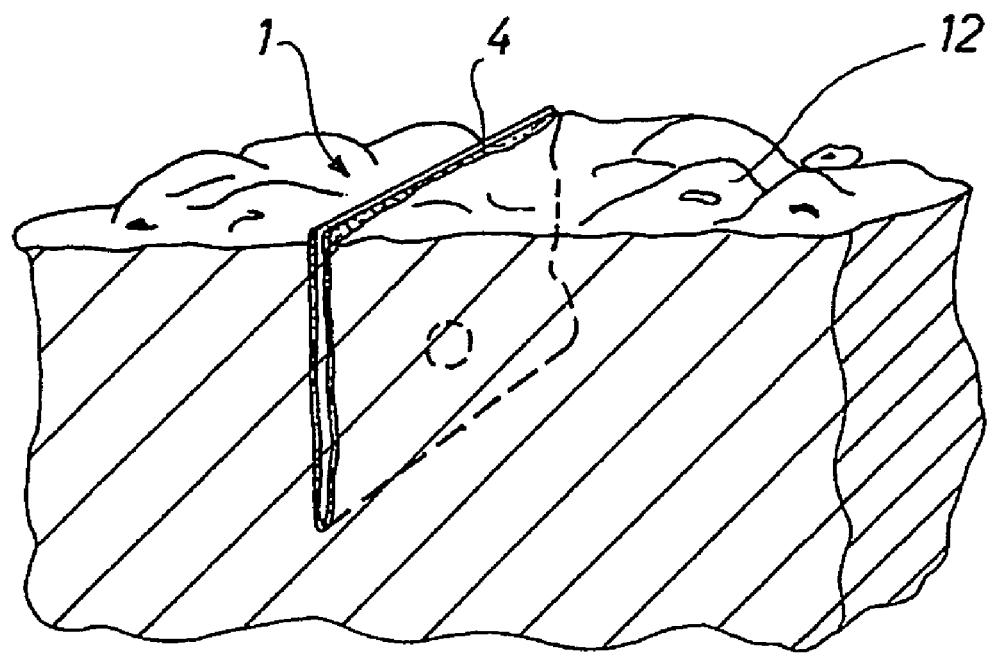
FIG. 3 is a perspective view of a portion of a seed tape bedded out in the ground, a small portion of said seed tape projecting beyond the surface of the ground.

FIG. 3 shows how the upper end of a seed tape 1 bedded out can project slightly by mistake from the ground, i.e. Beyond the surface 12 of the ground. Without the above zone 5 of water-repellent material a risk applies of the moisture contained in the germinating unit penetrating upwards through said germinating unit so as to evaporate above the surface of the ground. The latter applies in particular to the situation where the bedding out site is subjected to much wind and/or where the sun is shining on the projecting portion of the seed tape. The zone 5 of water-repellent material prevents the disadvantageous evaporation of water from the germinating unit.

Figure 4:
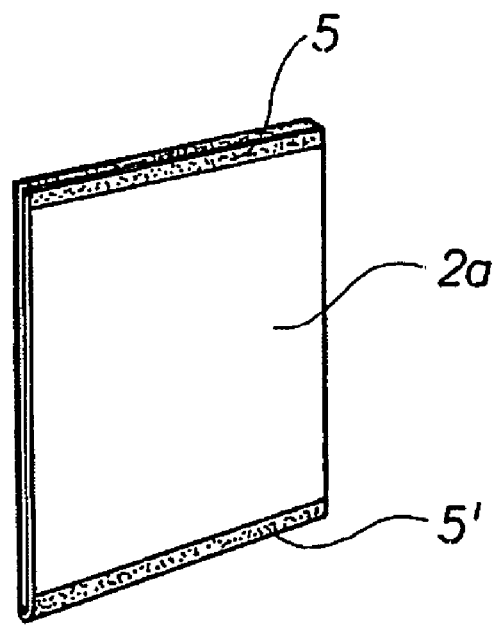
FIG. 4 is a perspective view of a germinating unit provided with a narrow zone of water-repellent material both at the top and at the bottom.

As illustrated in FIG. 4, each germinating unit 2a, 2b, 2c can be provided with a narrow zone 5' of water-repellent material at its lower edge 14 as well with the result that the release of water to a dry ground below said germinating unit is considerably reduced.

Figure 6:
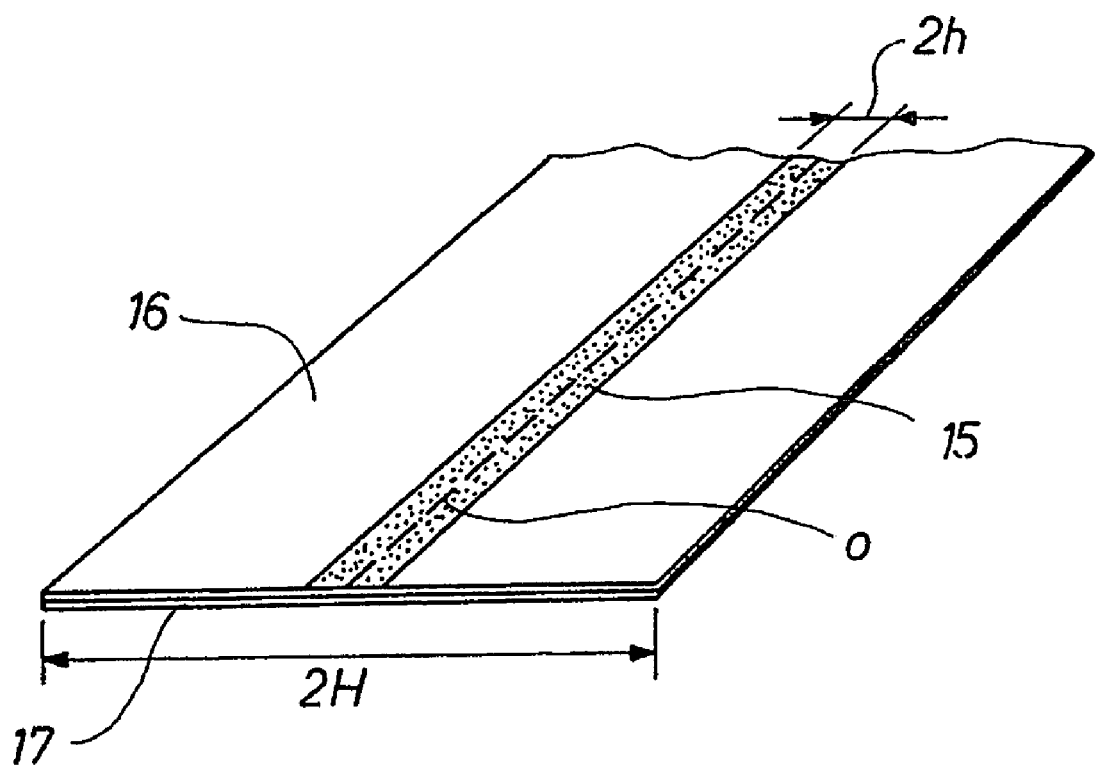
FIG. 6 is a perspective view of a portion of a continuous length suited for the manufacture of the germinating unit according to the invention.

FIG. 6 shows how a seed tape can be manufactured by means of continuous webs of paper 16, 17. These webs are of a width corresponding to twice the height of a germinating unit. A zone 15 of water-repellent material is applied onto the centre of the web, said zone 15 being of a width which is equal to 2 h. When the webs 16, 17 are slotted at the centre, i.e. along the line o, the complete seed tape is almost obtained. A carrier strip 3 must, however, be glued onto the web, optionally after the separation of the individual germinating units 2a, 2b, 2c. In the latter situation, the germinating units present a predetermined mutual distance and are glued to the cairrier strip 3.

The water-repellent material of the zone 5, 5' can be admixed a deterrent, preferably a substance affecting the sense of smell or taste of animals or birds.

Figure 5:
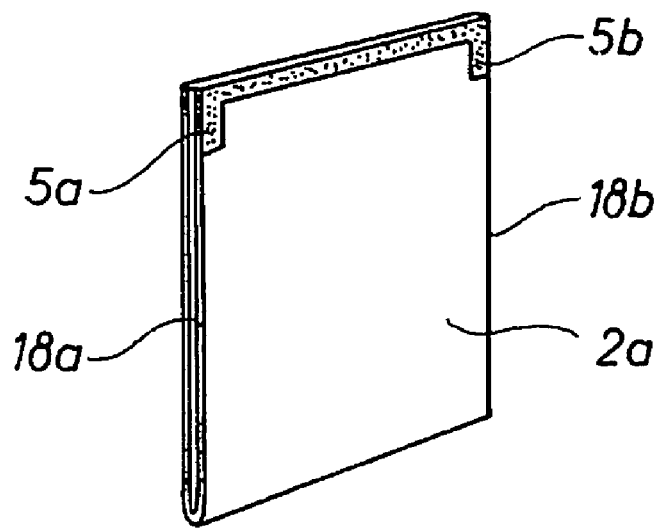
FIG. 5 is a perspective view of a germinating unit, where the narrow zone of water-repellent material at the top has been carried a short distance downwards along the two vertical edges of the germinating unit.

As illustrated in FIG. 5, the narrow zone 5 of water-repellent material can be extended at the ends a short distance downwards, cf. at 5a and 5b, whereby the zone extends slightly downwards along the vertical edges 18a and 18b of each germinating unit 2a.

In connection with the additive or additives 9 included in the mixture of substances encircling the seed 6, cf. above, it should be noted that it is a question of one or more water-absorbing materials, such as superabsorbing polymers (SAP). These materials can for instance be cross-linked polyacrylic acids, cross-linked isobutylene-maleic acid-copolymer derivatives, salts of cross-linked starch-polyacrylic acid, salts of cross-linked polyvinylalcohol-polyacrylic acids, cross-linked polyvinylalcohol derivatives, cross-linked polyethylene-glycol derivatives and cross-linked carboxymethylcellulose derivatives. When watered, the water-absorbing materials can include large amounts of water of benefit to the seed 6. The purpose of the narrow zone 5 of water-repellent material is to avoid loss of water from the additive or the additives 9.

The invention may be modified in many ways without thereby deviating from the scope of the invention.

The invention claimed is:

1. A seed tape including successively arranged germinating units made of plane material and being coherent or secured to a carrier strip of at least one layer of biodegradable material, and where each germinating unit intended to be vertically bedded out in the earth or in a growth substrate and in addition to one or more seeds includes a mixture of a carrier, at least one additive and a filler and adjuvants, and where the additive or the additives include water-absorbing materials, such as superabsorbing polymers, characterised in that each germinating unit is provided with at least one narrow zone of water-repellent material across said unit, adjacent or at least up to the upper edge of said unit, where the water-repellent material penetrates the plane material of the germinating unit throughout the entire thickness thereof.

2. A seed tape as claimed in claim 1, characterised in that the water-repellent material of the narrow zone is silicone or silicone oil.

3. A seed tape as claimed in claim 1, characterised in that the narrow zone of water-repellent material is of a height of at least 1 mm.

4. A seed tape as claimed in claim 1, characterised in that the narrow zone of water-repellent material is of a height of 3.5 to 10 mm.

5. A seed tape as claimed in claim 1, characterised in that the narrow zone of water-repellent material is of a height of 5 to 10% of the height of the germinating unit.

6. A seed tape as claimed in claim 1, characterised in that the plane material of the germinating units is paper, of a weight of 30 to 60 g/m$^2$ and that the carrier strip is made of paper as well.

7. A seed tape as claimed in claim 1, characterised in that the water-repellent material of the narrow zone is wax, stearin, paraffin or caoutchouc applied onto the plane material of the germinating unit as a hot melt and subsequently cured.

8. A seed tape as claimed in claim 1, characterised in that the water-repellent material of the narrow zone is a plastic.

9. A seed tape as claimed in claim 1, characterised in that a narrow zone of water-repellent material is provided at or adjacent the lower edge of each germinating unit.

10. A seed tape as claimed in claim 1, characterised in that said tape is continuously manufactured as the germinating units are manufactured by means of one or more paper ribbons of a width twice the width of the completed seed tape, a zone of water-repellent material of a double width being applied onto the center of said paper ribbon, whereafter said paper ribbon or ribbons are slotted through the center of the water-repellent zone.

11. A seed tape as claimed in claim 1, characterised in that a deterrent is added to the water-repellent material of the narrow zone, said deterrent preferably being a substance affecting the sense of smell or taste of animals or birds.

12. A seed tape as claimed in claim 1, characterised in that at the upper edge of the germinating unit, the narrow zone of water-repellent material is extended slightly downwards along the vertical edges of said germinating unit.

13. A seed tape as claimed in claim 1 further comprising a filler and adjuvants.

14. A seed tape as claimed in claim 4 wherein said height is 4 to 8 mm.

15. A seed tape as claimed in claim 6 wherein said height is 5 mm.

16. A seed tape as claimed in claim 6 wherein said weight is 40 to 50 g/m$^2$.

17. A seed tape as claimed in claim 8 wherein said plastic comprises a polylactide (PLA).

18. A seed tape as claimed in claim 9 wherein said plastic comprises a polysaccharide.

* * * * *